United States Patent
Choi et al.

(10) Patent No.: US 12,002,980 B2
(45) Date of Patent: Jun. 4, 2024

(54) BATTERY PACK INCLUDING A FRAME

(71) Applicant: SAMSUNG SDI CO., LTD., Yongin-si (KR)

(72) Inventors: Seonung Choi, Yongin-si (KR); Jaelim Ryu, Yongin-si (KR); Hoomin Lee, Yongin-si (KR); Hanho Kim, Yongin-si (KR); Jonghyun Lee, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 324 days.

(21) Appl. No.: 17/201,271

(22) Filed: Mar. 15, 2021

(65) Prior Publication Data

US 2021/0313642 A1   Oct. 7, 2021

(30) Foreign Application Priority Data

Apr. 1, 2020 (KR) .................... 10-2020-0039949

(51) Int. Cl.
*H01M 50/209* (2021.01)
*H01M 50/244* (2021.01)
*H01M 50/271* (2021.01)
*H01M 50/289* (2021.01)
*H01M 50/291* (2021.01)
*H01M 50/502* (2021.01)

(52) U.S. Cl.
CPC ....... *H01M 50/209* (2021.01); *H01M 50/244* (2021.01); *H01M 50/271* (2021.01); *H01M 50/289* (2021.01); *H01M 50/291* (2021.01); *H01M 50/502* (2021.01)

(58) Field of Classification Search
CPC ............. H01M 50/209; H01M 50/289; H01M 10/0481; H01M 50/244; H01M 10/0486
See application file for complete search history.

(56) References Cited

U.S. PATENT DOCUMENTS

| | | | |
|---|---|---|---|
| 7,858,224 B2 | 12/2010 | Kim et al. | |
| 8,999,557 B2 | 4/2015 | Kim | |
| 9,564,663 B2 | 2/2017 | Kim et al. | |
| 9,570,721 B2 | 2/2017 | Kim | |
| 9,748,539 B2 | 8/2017 | Kim et al. | |
| 10,644,283 B2 | 5/2020 | Sakurai | |
| 2011/0262799 A1* | 10/2011 | Kim .................... | H01M 50/289 |
| | | | 429/156 |

(Continued)

FOREIGN PATENT DOCUMENTS

| CN | 1992385 A | 7/2007 |
|---|---|---|
| CN | 102237501 A | 11/2011 |

(Continued)

OTHER PUBLICATIONS

Chinese Office action dated Nov. 3, 2022.

*Primary Examiner* — Imran Akram
(74) *Attorney, Agent, or Firm* — Lee IP Law, P.C.

(57) ABSTRACT

A battery pack including a plurality of battery cells arranged in a first direction; and a first frame and a second frame each extending in the first direction with the plurality of battery cells therebetween, the first frame and the second frame surrounding outer surfaces of the plurality of battery cells and being fitted into each other in a second direction that intersects with the first direction.

23 Claims, 7 Drawing Sheets

(56) References Cited

U.S. PATENT DOCUMENTS

| | | | |
|---|---|---|---|
| 2013/0189559 A1* | 7/2013 | Giere | H01M 10/655 |
| | | | 429/120 |
| 2014/0087221 A1* | 3/2014 | Kim | H01M 50/211 |
| | | | 429/158 |
| 2014/0356690 A1* | 12/2014 | Kim | H01M 50/271 |
| | | | 429/156 |
| 2015/0079451 A1 | 3/2015 | Jeong et al. | |
| 2015/0333305 A1* | 11/2015 | Seki | H01M 10/625 |
| | | | 429/152 |
| 2016/0141737 A1* | 5/2016 | Kubota | H01M 10/0486 |
| | | | 429/120 |
| 2016/0336549 A1* | 11/2016 | Brisbane | H01M 50/271 |
| 2019/0006643 A1 | 1/2019 | Sakurai | |
| 2019/0013500 A1* | 1/2019 | Sakurai | H01M 50/296 |
| 2019/0115573 A1* | 4/2019 | Sakurai | B60L 50/64 |
| 2021/0143508 A1* | 5/2021 | Yoshida | H01M 50/291 |

FOREIGN PATENT DOCUMENTS

| | | |
|---|---|---|
| CN | 103608946 A | 2/2014 |
| CN | 104218197 A | 12/2014 |
| CN | 104466049 A | 3/2015 |
| CN | 107732063 A | 2/2018 |
| CN | 109148756 A | 1/2019 |
| CN | 109216608 A | 1/2019 |
| JP | 2016-152203 A | 2/2015 |
| KR | 10-2015-0031095 A | 3/2015 |
| KR | 10-2015-0057261 A | 5/2015 |
| KR | 10-1994039 B1 | 6/2019 |

\* cited by examiner

BATTERY PACK INCLUDING A FRAME

CROSS-REFERENCE TO RELATED APPLICATION

Korean Patent Application No. 10-2020-0039949, filed on Apr. 1, 2020 in the Korean Intellectual Property Office, and entitled: "Battery Pack," is incorporated by reference herein in its entirety.

BACKGROUND

1. Field

Embodiments relate to a battery pack.

2. Description of Related Art

Unlike a primary battery which is not rechargeable, generally, a secondary battery is rechargeable and dischargeable. A secondary battery may be used as an energy source of mobile apparatuses, electric automobiles, hybrid automobiles, electric bicycles, uninterruptible power supplies, or the like, and may be used in the form of a single battery or a module in which a plurality of batteries are connected and bound in one unit, depending on the kind of an external apparatus to which the second battery is applied.

SUMMARY

The embodiments may be realized by providing a battery pack including a plurality of battery cells arranged in a first direction; and a first frame and a second frame each extending in the first direction with the plurality of battery cells therebetween, the first frame and the second frame surrounding outer surfaces of the plurality of battery cells and being fitted into each other in a second direction that intersects with the first direction.

Each of the first and second frames may include a side portion extending in the first direction; and a first end portion and a second end portion each extending in the second direction that intersects with the first direction from a front end and a rear end of the side portion in the first direction, and surrounding a front and a rear of the plurality of battery cells.

The first end portions of the first and second frames may have complementary shapes such that the first end portions are fitted into and engaged with each other, and the second end portions of the first and second frames may have complementary shapes such that the second end portions are fitted into and engaged with each other.

The first end portion and the second end portion of the first and second frames may each include finger portions and a base portion, the finger portions may have complementary comb shapes and are fitted into each other, and the base portion may connect the finger portions to each other.

The first end portion and the second end portion of each of the first and second frames may include protrusions extending in the second direction and recesses recessed in the second direction, the protrusions and recesses being alternately stacked in a third direction that intersects with the first direction and the second direction.

The battery pack may further include a first coupling block configured to couple the first end portions of the first and second frames to each other and extending across the first end portions of the first and second frames that are fitted and engaged with each other; and a second coupling block configured to couple the second end portions of the first and second frames to each other and extending across the second end portions of the first and second frames that are fitted and engaged with each other.

The first coupling block may be assembled in a third direction onto the first end portions of the first and second frames that are fitted and engaged with each other, the third direction intersecting with the second direction, and the second coupling block may be assembled in the third direction onto the second end portions of the first and second frames that are fitted and engaged with each other.

The first end portion and the second end portion may each include a hollow cavity portion therein, and at least a portion of the first coupling block and the second coupling block may be fitted into the cavity portions of the first end portion and the second end portion.

The first end portion and the second end portion may each further include double plates facing each other in the first direction with the cavity portion therebetween, and protrusions extending in the second direction and recesses recessed in the second direction alternately stacked in a third direction of the double plate.

The first coupling block and the second coupling block may each include a middle block inserted into the cavity portion; and a cover plate spaced apart from the middle block with an assembly groove between the cover plate and the middle block.

At least a portion of the first end portion and the second end portion may be fitted into the assembly groove.

The cover plate may include a pair of an inner cover plate and an outer cover plate over two opposite sides of the middle block, the inner cover plate and the outer cover plate being spaced apart from each other with the assembly groove therebetween.

The first end portion and the second end portion may each include double plates facing each other in the first direction with the hollow cavity portion therebetween, and the double plates may be each fitted into one assembly groove between the inner cover plate and the middle block, and another assembly groove between the outer cover plate and the middle block.

The double plates of the first end portion and the second end portion, the inner and outer cover plates, and the middle block may overlap one another to constitute a total of a five-layered overlapping structure at front and rear positions of the plurality of battery cells.

The inner cover plate may be between the first end portion and the plurality of battery cells and between the second end portion and the plurality of battery cells, and the outer cover plate may be on an outer surface of the first end portion and an outer surface of the second end portion.

The first coupling block and the second coupling block may each include an electrically insulating resin material.

The side portion may include a plurality of lines of reinforcing ribs having concave or convex shapes and extending side by side in the first direction.

The plurality of battery cells may each include a terminal surface, a bottom surface, a main surface, and a lateral surface, the terminal surface includes at least one electrode terminal, the bottom surface is opposite to the terminal surface, the main surface connects the terminal surface to the bottom surface and has a first area, and the lateral surface connects the terminal surface to the bottom surface and has a second area, the second area being smaller than the first area.

The side portion may support the terminal surface and the bottom surface of the plurality of battery cells and includes a first protrusion piece and a second protrusion piece each protruding from a main body of the side portion that covers lateral surfaces of the plurality of battery cells to the terminal surface and the bottom surface.

The battery pack may further include a bus bar holder on the terminal surface of the plurality of battery cells and configured to guide an assembling position of a bus bar connected to the electrode terminal of the plurality of battery cells.

The first protrusion piece may be on a rim of the bus bar holder.

The second protrusion piece may be on the bottom surface of the plurality of battery cells.

A coupling hole may be at an edge position where the side portion meets the first end portion and at an edge position where the side portion meets the second end portion.

The coupling hole may include a hollow cavity.

At least a portion of the coupling hole may be exposed between the side portion and the first end portion and between the side portion and the second end portion.

The battery pack may further include a spacer assembly between adjacent battery cells in the first direction, the spacer assembly including spacers having a rim shape surrounding an opening at a central position.

The spacers of the spacer assembly may be arranged in the first direction, and each of the spacers may be connected to an adjacent spacer in the spacer assembly, the spacers being connected with a plurality of connectors that connect the adjacent spacers at alternating positions of one side and another side opposite to each other in the second direction, and extending in the first direction.

BRIEF DESCRIPTION OF THE DRAWINGS

Features will be apparent to those of skill in the art by describing in detail exemplary embodiments with reference to the attached drawings in which.

DETAILED DESCRIPTION

Figure 1:
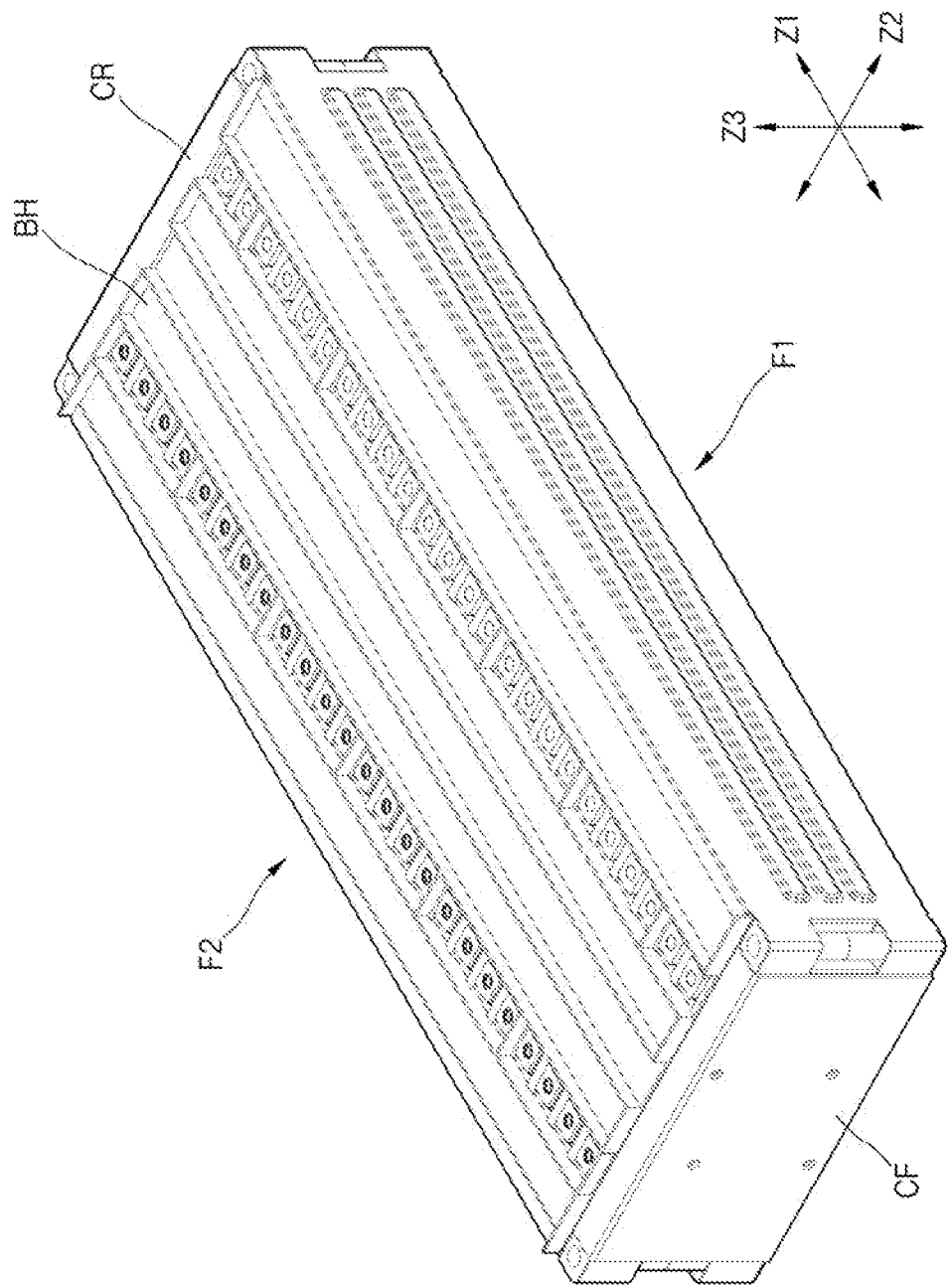
FIG. 1 is a perspective view of a battery pack according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or element, it can be directly on the other layer or element, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

As used herein, the terms "or" and "and/or" are not exclusive terms and include any and all combinations of one or more of the associated listed items. Expressions such as "at least one of," when preceding a list of elements, modify the entire list of elements and do not modify the individual elements of the list.

Hereinafter, a battery pack according to an embodiment is described with reference to the accompanying drawings.

Figure 2:
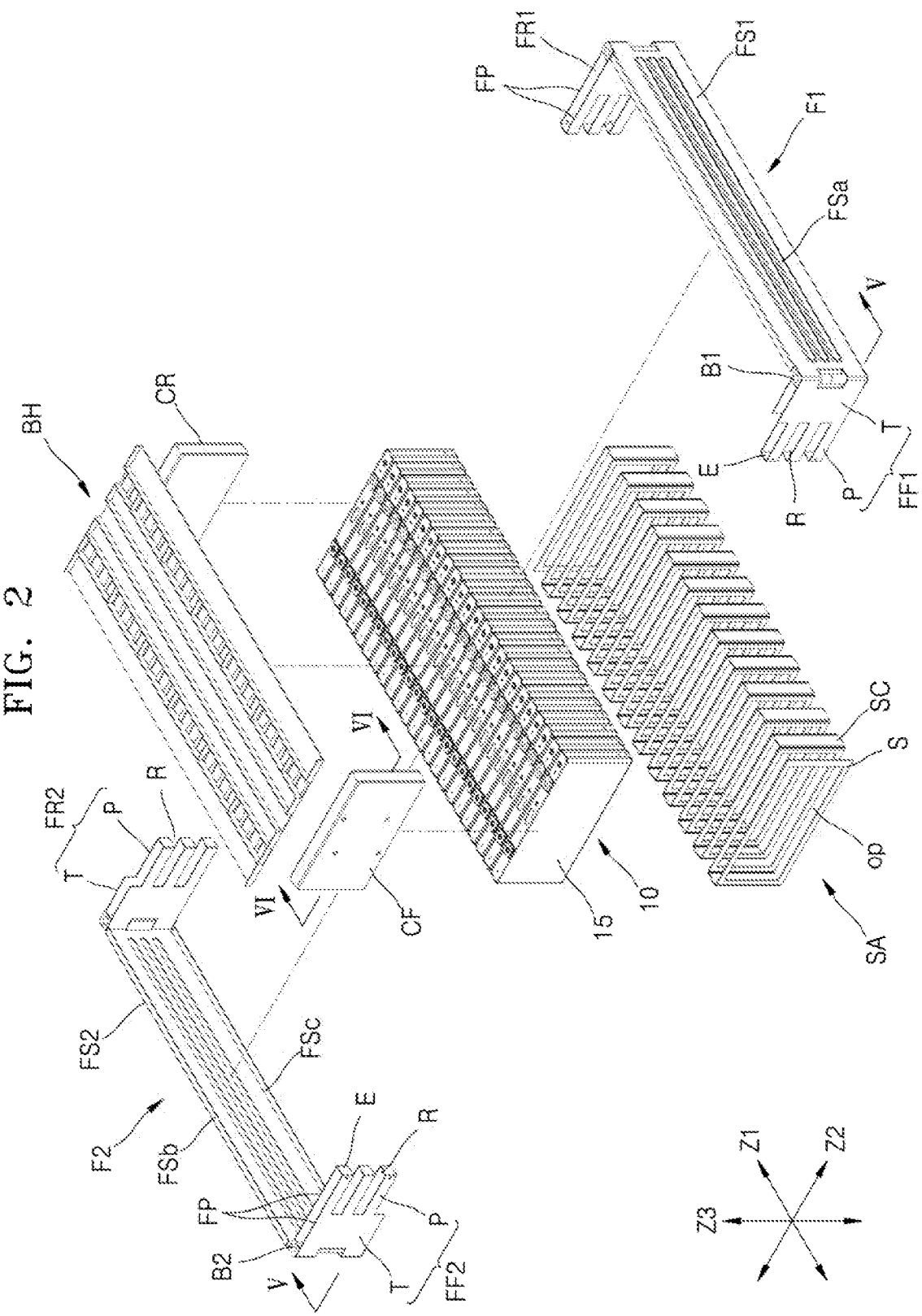
FIG. 2 is an exploded perspective view of the battery pack shown in FIG. 1.
Figure 3:
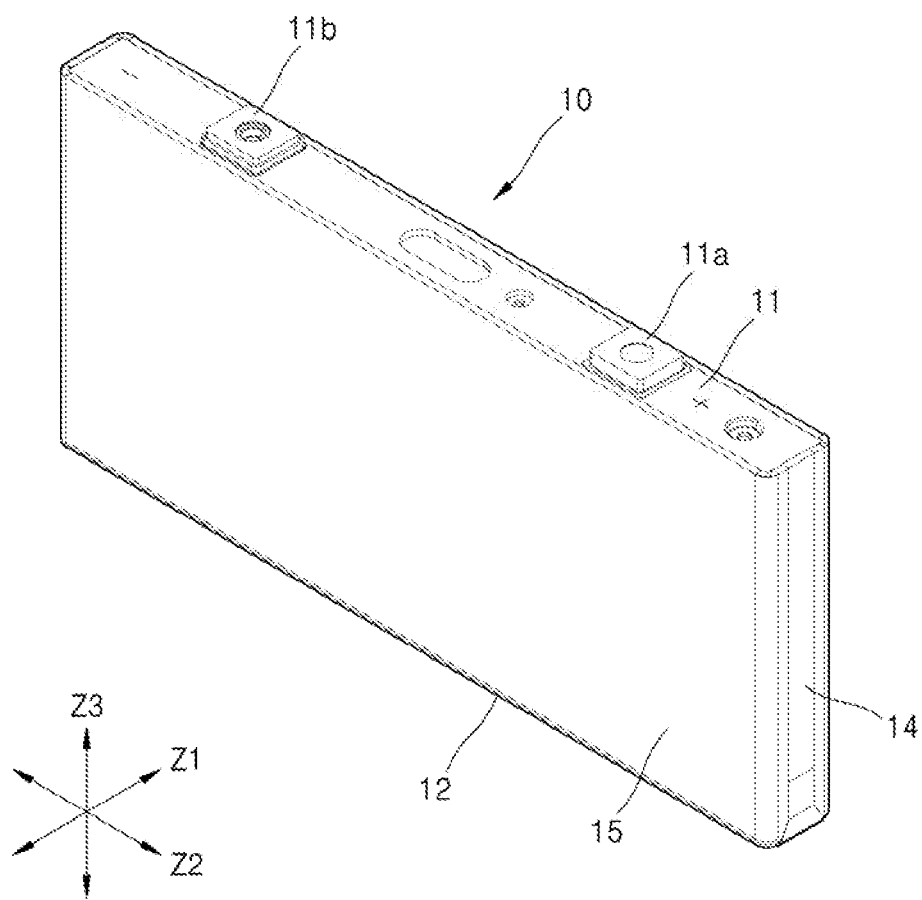
FIG. 3 is a perspective view of a battery cell shown in FIG. 1.
Figure 4:
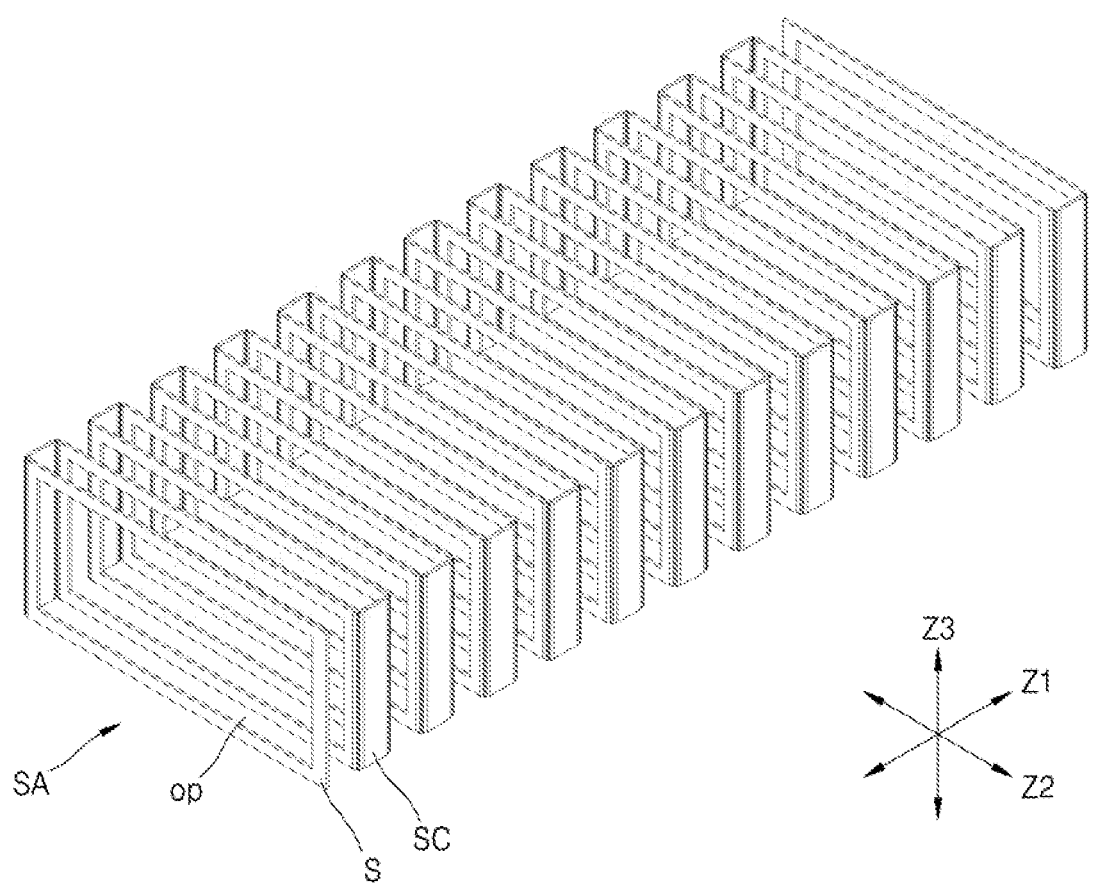
FIG. 4 is a view of a spacer shown in FIG. 2.
Figure 5:
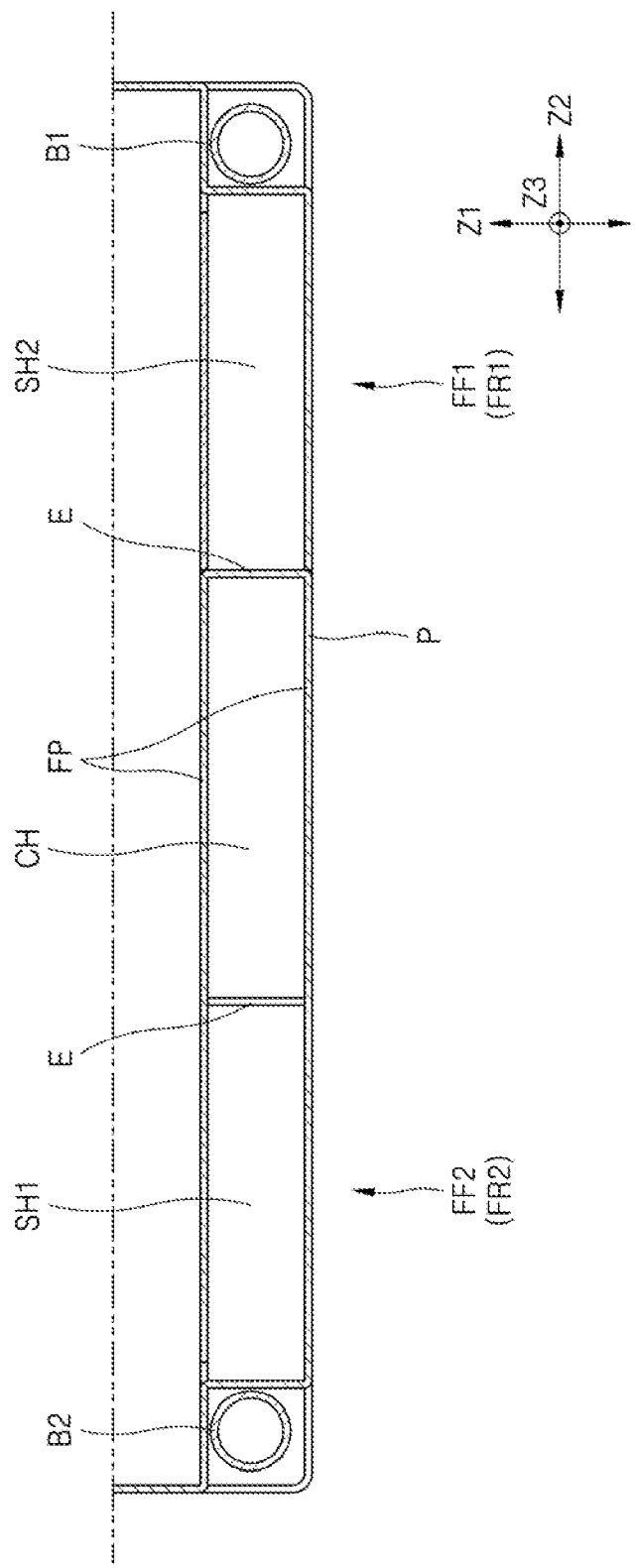
FIGS. 5 and 6 are cross-sectional views of a first end portion and a first coupling block shown in FIG. 2, taken along lines V-V and VI-VI of FIG. 2.
Figure 6:
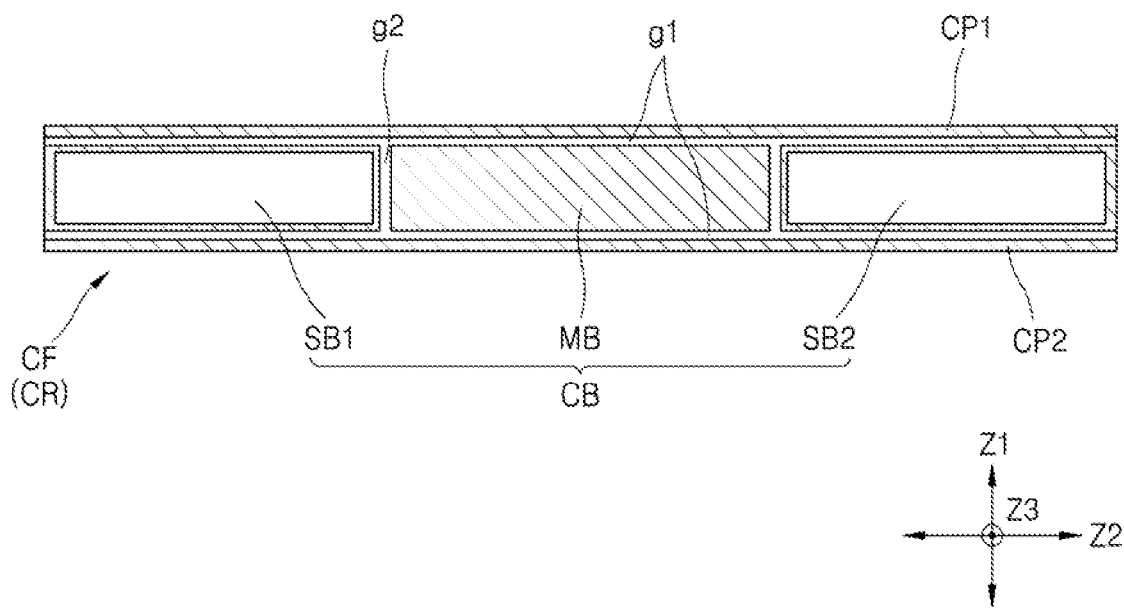
Figure 7:
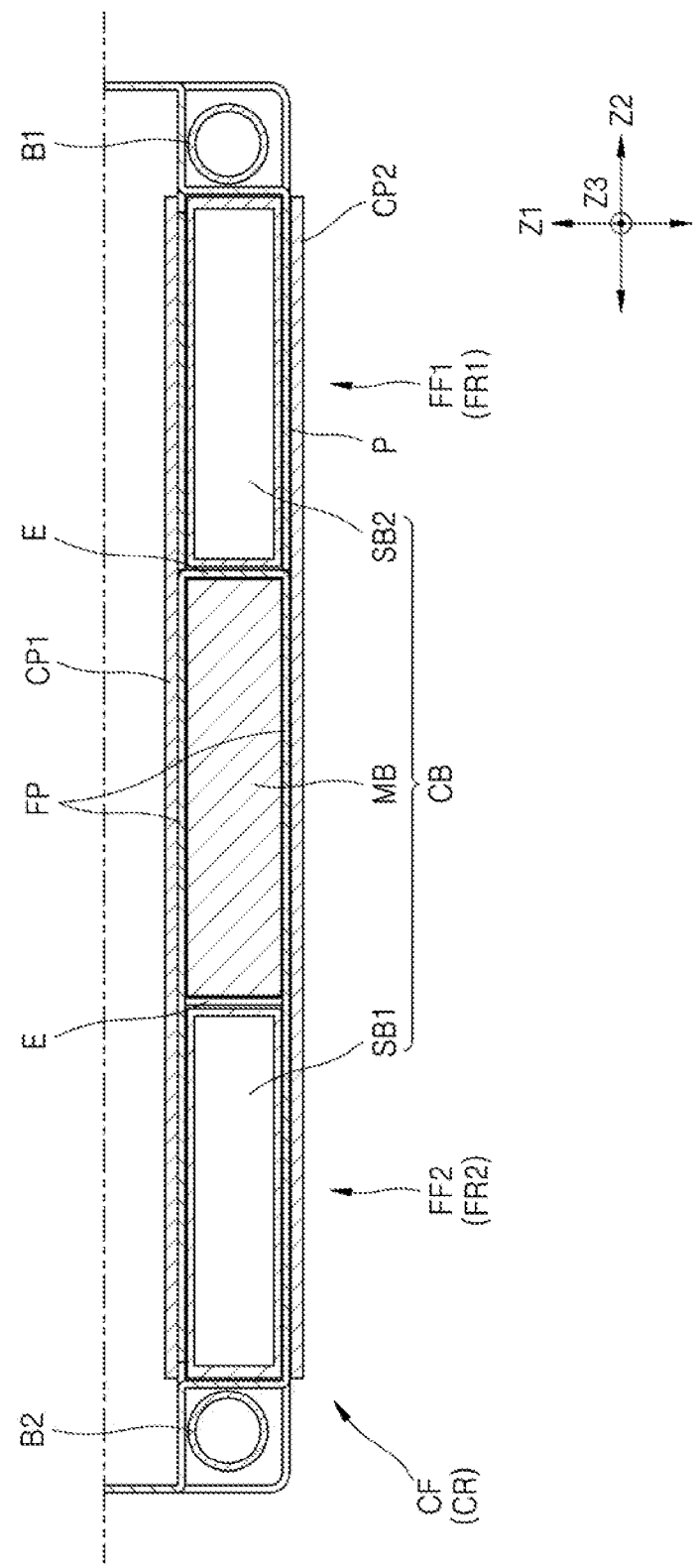
FIG. 7 is a cross-sectional view of coupling between the first end portion and the first coupling block shown in FIGS. 5 and 6.

FIG. 1 is a perspective view of a battery pack according to an embodiment. FIG. 2 is an exploded perspective view of the battery pack shown in FIG. 1. FIG. 3 is a perspective view of the battery cell shown in FIG. 1. FIG. 4 is a view of a spacer shown in FIG. 2. FIGS. 5 and 6 are cross-sectional views of a first end portion and a first coupling block shown in FIG. 2, taken along lines V-V and VI-VI of FIG. 2. FIG. 7 is a cross-sectional view of coupling between the first end portion and the first coupling block shown in FIGS. 5 and 6.

Referring to FIG. 2, a battery pack according to an embodiment may include a plurality of battery cells 10 arranged (e.g., aligned) in a first direction Z1, and first and second frames F1 an F2 extending (e.g., lengthwise) in the first direction Z1 with the plurality of battery cells 10 therebetween. In an implementation, the first and second frames F1 an F2 may surround the outer (e.g., side) surfaces of the plurality of battery cells 10 and may be fitted into (e.g., coupled to) each other in a second direction Z2 that intersects with the first direction Z1. In an implementation, the second direction Z2 may denote a direction that perpendicularly intersects with the first direction Z1.

The first and second frames F1 and F2 may respectively include side portions FS1 and FS2 each extending (e.g., lengthwise) in the first direction Z1, and first end portions FF1 and FF2 and second end portions FR1 and FR2 each extending (e.g., lengthwise) in the second direction Z2 from front ends and rear ends of the side portions FS1 and FS2. The first end portions FF1 and FF2 and second end portions FR1 and FR2 may surround or cover the front and the rear of the plurality of battery cells 10. In this case, the first end portions FF1 and FF2 of the first and second frames F1 and F2, and the second end portions FR1 and FR2 of the first and second frames F1 and F2 may be fitted into or coupled with each other.

The first end portions FF1 and FF2 of the first and second frames F1 and F2 that are fitted into each other may be mutually coupled with a first coupling block CF fitted into the first end portions FF1 and FF2 and across the first end portions FF1 and FF2 in a third direction intersecting with the first and second directions Z1 and Z2. In an implementation, the second end portions FR1 and FR2 of the first and second frames F1 and F2 that are fitted into each other may be mutually coupled with a second coupling block CR fitted into the second end portions FR1 and FR2 across the second end portions FR1 and FR2 in the third direction Z3. In an implementation, the third direction Z3 may denote a direction that perpendicularly intersects with the first direction Z1 and the second direction Z2.

Hereinafter, the battery pack according to an embodiment is described in more detail. For reference, throughout the specification, the plurality of battery cells 10 constituting the battery pack may be denoted by a group of battery cells 10.

Both the plurality of battery cells 10 and the group of battery cells 10 may denote the battery cells 10 constituting the battery pack.

Referring to FIG. 3, each battery cell 10 may include a terminal surface 11, a bottom surface 12, a main surface 15, and a lateral surface 14. In an implementation, electrode terminals 11a and 11b may be on the terminal surface 11. The bottom surface 12 may be opposite (e.g., and parallel) to the terminal surface 11. The main surface 15 may connect the terminal surface 11 to the bottom surface 12 and may have a relatively large first area. The lateral surface 14 may connect the terminal surface 11 to the bottom surface 12 and may have a relatively small second area (e.g., the second area may be smaller than the first area). In an implementation, the electrode terminals 11a and 11b may include a pair of first and second electrode terminals 11a and 11b having different polarities. The first and second electrode terminals 11a and 11b may be spaced apart in the second direction Z2. In an implementation, at least one of the first and second electrode terminals 11a and 11b may be omitted. In this case, a portion of the outer surface of the battery cell 10 may serve as the first and second electrode terminals 11a and 11b.

The main surface 15 of the battery cell 10 may include a pair of main surfaces 15 on two opposite sides in the first direction Z1. The battery cells 10 may be arranged in the first direction Z1, and the main surfaces 15 of neighboring battery cells 10 may face each other. In an implementation, the main surfaces 15 of the battery cells 10 at the foremost (e.g., the battery cell 10 at the front end of the row of battery cells 10) and the rearmost (e.g., the battery cell 10 at the rear end of the row of battery cells 10) in the first direction Z1 from among the group of battery cells 10 constituting the battery pack may be surrounded or covered by the first end portions FF1 and FF2 and the second end portions FR1 and FR2 of the first and second frames F1 and F2. The first and second frames F1 and F2 are described below in more detail.

The lateral surface 14 of the battery cell 10 may include a pair of lateral surfaces 14 on two opposite sides in the second direction Z2. The pair of lateral surfaces 14 may be surrounded or covered by the side portions FS1 and FS2 of the first and second frames F1 and F2. The side portions FS1 and FS2 of the first and second frames F1 and F2 may surround or cover the lateral surfaces 14 of the group of battery cells 10 and may extend across the lateral surfaces 14 of the group of battery cells 10 arranged in the first direction Z1.

Referring to FIGS. 2 and 4, the group of battery cells 10 constituting the battery pack may be arranged in a line in the first direction Z1, and a spacer S may be arranged between neighboring battery cells 10. The spacer S may block electric interference and thermal interference between neighboring battery cells. In an implementation, the spacer S may provide clearance for allowing a volume expansion caused by the swelling of the battery cell 10 due to charging/discharging operations. For this purpose, an opening op may be in a central position of the spacer S. The spacer S may be in the form of a rim surrounding the opening op at the central position. In some cases, the swelling of one battery cell 10 may appear as pressure against another neighboring battery cell 10, and accordingly, position movement of the other neighboring battery cell 10 may be forced. The position movement of the battery cells 10 may be accumulated in the first direction Z1. In an implementation, the swelling of the battery cell 10 may be allowed through the opening op at the central position of the spacer S, and the position movement of the battery cell 10 due to pressure applied between neighboring battery cells 10 may be suppressed. Accordingly, a load burden of the first and second frames F1 and F2 for structurally connecting the group of battery cells 10 may be reduced, and weakening of coupling force of the battery pack due to the transformation of the first and second frames F1 and F2 may be prevented.

In an implementation, the spacer S may be connected to another neighboring or adjacent spacer S through a connection portion or connector SC. In this case, the connector SC may connect neighboring spacers S to each other and may extend in the first direction, thereby constituting a one-piece spacer assembly SA. The connector SC may be on one side and another side of the spacer S in the second direction Z2, and may be alternately on opposite positions at one side and the other side of the spacer S. In an implementation, the spacer assembly SA may have a zigzag (e.g., corrugated or continuous undulating) shape in the first direction Z1 through the connectors SC that respectively cover the opposite lateral surfaces 14 of neighboring battery cells 10. The plurality of spacers S between the neighboring battery cells 10 in the first direction Z1 may be in the form of the spacer assembly SA through the connector SC that connects the plurality of spacers S into a one-piece structure. Accordingly, handling of the plurality of spacers S may be improved, and the rigidity of the entire battery pack may be reinforced in the first direction Z1.

Referring to FIG. 2, the first and second frames F1 and F2 may face each other in the second direction Z2 with the group of battery cells 10 therebetween, and may be fitted into or coupled to each other in the second direction Z2 to entirely surround the outside of the (e.g., sides of the) group of battery cells 10. In an implementation, the first and second frames F1 and F2 may structurally connect the group of battery cells 10 while surrounding the outside of the group of battery cells 10. In an implementation, the connection structure that entirely surrounds the group of battery cells 10 may be provided by assembling of the first and second frames F1 and F2 having a form divided into two.

The first and second frames F1 and F2 may each be integrally formed as one part as a whole, respectively. The first and second frames F1 and F2 may each include the same material, e.g., a metal material. In an implementation, the first and second frames F1 and F2 may include a metal material such as aluminum or an aluminum alloy, which is light and advantageous in weight reduction and has an excellent heat-dissipating characteristic.

Referring to FIGS. 2 and 5, the first and second frames F1 and F2 may include the side portions FS1 and FS2, the first end portions FF1 and FF2, and the second end portions FR1 and FR2. In an implementation, the side portions FS1 and FS2 may extend across the lateral surfaces 14 of the group of battery cells 10 in the first direction Z1. In an implementation, the first end portions FF1 and FF2 and the second end portions FR1 and FR2 may extend in the second direction Z2 from the front end and the rear end that form the two opposite ends of the side portions FS1 and FS2 in the first direction Z1 and may surround or cover the front and the rear of the group of battery cells 10.

The side portions FS1 and FS2 of the first and second frames F1 and F2 may extend in the first direction Z1 with the group of battery cells 10 therebetween, and may surround or cover the lateral surfaces 14 of the group of battery cells 10 at the facing positions while facing each other in the second direction Z2. Transformation such as warping or sagging could occur to the side portions FS1 and FS2 as the side portions FS1 and FS2 extend relatively long in the first direction Z1 in which the group of battery cells 10 are arranged. In an implementation, to supplement the rigidity of the side portions FS1 and FS2, reinforcement ribs FSa having a concave shape or a convex shape may be on the side portions FS1 and FS2. In an implementation, the reinforcement ribs FSa may extend in the first direction Z1 side by side (e.g., in parallel) along the entire length of the side portions FS1 and FS2 and may include a plurality of lines of reinforcement ribs FSa having a convex shape. In an implementation, the reinforcement ribs FSa may having a convex shape facing in a direction opposite to or away from the battery cells 10 to avoid interference with the battery cells 10.

First and second protrusion pieces FSb and FSc may be on the side portions FS1 and FS2. In an implementation, the first and second protrusion pieces FSb and FSc may support the terminal surface 11 and the bottom surface 12 of the battery cells 10. The first and second protrusion pieces FSb and FSc may protrude toward the battery cell 10 from the main body of the side portions FS1 and FS2 that surround or cover the lateral surfaces 14 of the battery cells 10, and may protrude toward or onto the terminal surface 11 and the bottom surface 12 of the battery cell 10 to support the terminal surface 11 and the bottom surface 12 of the battery cell 10. In an implementation, the first protrusion piece FSb may support the terminal surface 11 of the battery cells 10 with a rim of a bus bar holder BH therebetween, the bus bar holder BH extending across the terminal surface 11 of the group of battery cells 10. In an implementation, the bus bar holder BH may be between the first protrusion piece FSb and the terminal surface 11 of the battery cells 10. In an implementation, the second protrusion piece FSc may directly hold up and support the bottom surface 12 of the battery cell 10 while extending across the bottom surface 12 of the group of battery cells 10. The battery cells 10 may be more firmly fixed inside the first and second frames F1 and F2 through the first and second protrusion pieces FSb and FSc. The first and second protrusion pieces FSb and FSc may have a structure protruding from the main body of the side portions FS1 and FS2 to the battery cells 10 to supplement the rigidity of the side portions FS1 and FS2.

The first end portions FF1 and FF2 and the second end portions FR1 and FR2 may extend in the second direction Z2 from the front ends and the rear ends of the side portions FS1 and FS2 in the first direction Z1 to surround or cover the front and the rear of the group of battery cells 10. The first end portions FF1 and FF2 and the second end portions FR1 and FR2 may provide coupling positions of the first and second frames F1 and F2. Hereinafter, the first end portions FF1 and FF2 are described first, and then the second end portions FR1 and FR2 are described.

The first end portions FF1 and FF2 of the first and second frames F1 and F2 may be fitted into or coupled to each other. In an implementation, the first end portions FF1 and FF2 of the first and second frames F1 and F2 may include finger portions P and base portions T, the finger portions P having a comb shape such that the finger portions P are fitted into or coupled to each other, and the base portions T connecting the finger portions P (of the first end portion FF1 or the second end portion FF2). In an implementation, the finger portions P may extend in the second direction Z2, at a position relatively close (e.g., proximate) to the opposite first end portions FF1 and FF2 from among the first end portions FF1 and FF2 of the first and second frames F1 and F2. The base portion T may be at a position relatively away from (e.g., distal to) the opposite first end portions FF1 and FF2. In an implementation, the finger portions P may extend in the second direction Z2, on the central positions of the main surface 15 of the battery cell 10. The base portions T may be on the edge position of the main surface 15 of the battery cell 10.

Protrusions (corresponding to the finger portions P) in the second direction Z2 and recesses R in the second direction Z2 may be alternately at alternating positions in the third direction Z3 of each of the first end portions FF1 and FF2 on the first and second frames F1 and F2. The protrusions (corresponding to the finger portions P) and the recesses R may be at alternating positions, and the protrusions (corresponding to the finger portions P) and the recesses R of the first and second frames F1 and F2 may be engaged with recesses R and protrusions (corresponding to the finger portions P) of the opposite second and first frames F1 and F2. In an implementation, the finger portions P of the first and second frames F1 and F2 corresponding to the protrusions may be fitted into the recesses R in the opposite second and first frames F1 and F2. In an implementation, the finger portions P and the recesses R may have a complementary, interengaging relationship to facilitate coupling with one another.

Similar to the first end portions FF1 and FF2, the second end portions FR1 and FR2 of the first and second frames F1 and F2 may be fitted into each other. The second end portions FR1 and FR2 of the first and second frames F1 and F2 may include finger portions P and base portions T, the finger portions P having a comb shape such that the finger portions P may be fitted into each other, and the base portions T connecting the finger portions P. Protrusions (corresponding to the finger portions P) and recesses R may be alternately at alternating positions in the third direction Z3 of each of the second end portions FR1 and FR2 on the first and second frames F1 and F2. The protrusions (corresponding to the finger portions P) and the recesses R of the first and second frames F1 and F2 may be engaged with recesses R and protrusions (corresponding to the finger portions P) on the opposite second and first frames F1 and F2.

Referring to FIG. 5, the first end portions FF1 and FF2 may include a cavity portion that is empty inside or hollow. A portion of the first end portions FF1 and FF2 including at least the finger portions P may include a cavity portion that is empty inside. In an implementation, the cavity portion may extend across an entire width of the first end portions FF1 and FF2 in the second direction Z2. A first coupling block CF (e.g. a middle block CB, see FIG. 6) may be fitted in the cavity portion. In an implementation, the first coupling block CF may couple the first end portions FF1 and FF2 of the first and second frames F1 and F2 to each other. In an implementation, the first end portions FF1 and FF2 may include double plates FP that face each other with the cavity portion therebetween in the first direction Z1. The double plates FP may include the protrusions (or the finger portions P) and the recesses R at the alternating positions in the third direction Z3. The double plates FP constituting the first end portions FF1 and FF2 may be connected to each other through an end surface E of the finger portion P having a closed shape. In an implementation, the cavity portion may include a central cavity portion CH and first and second side cavity portions SH1 and SH2 that are separated from each other by the end surface E of the finger portion P of the first and second frames F1 and F2.

Referring to FIGS. 5 and 6, the first coupling block CF may include the middle block CB and cover plates CP1 and CP2. In an implementation, the middle block CB may be inserted into the cavity portion of the first end portions FF1 and FF2, and the cover plates CP1 and CP2 may be spaced apart from the middle block CB with an assembly groove g1 therebetween. The cover plates CP1 and CP2 may be a pair of cover plates CP1 and CP2 at front and back sides over two opposite sides of the middle block CB in the first direction Z1, and may include an inner cover plate CP1 and an outer cover plate CP2. The assembly groove g1 may be between the inner and outer cover plates CP1 and CP2 and the middle block CB. In an implementation, the double plates FP that constitute the first end portions FF1 and FF2 may be respectively fitted into the pair of assembly grooves g1 in the first coupling block CF.

The first coupling block CF may have a triple overlapping structure that includes the middle block CB and the pair of inner and outer cover plates CP1 and CP2 at a front and back over two opposite sides of the middle block CB in the first direction Z1. The middle block CB and the inner and outer cover plates CP1 and CP2 may be spaced apart from each other with the assembly groove g1 therebetween. In an implementation, the middle block CB and the inner and outer cover plates CP1 and CP2 that are separated from each other may be coupled to each other on one side of the first coupling block CF, e.g., on the upper end of the first coupling block CF in the third direction Z3, and thus, may be integrated as a one-piece first coupling block CF.

As described above, the triple overlapping structure of the first coupling block CF and the double plates FP that constitute the first end portions FF1 and FF2 may constitute a five-fold or five-layered overlapping structure at the front position of the group of battery cells 10, and may firmly support the group of battery cells 10. In an implementation, the five-fold or five-layered overlapping structure at the front of the group of battery cells 10 may help effectively suppress the swelling of the battery cell 10 that expands in curves due to charging/discharging, and may help block a change in a resistance characteristic due to the volume expansion of the battery cell 10 and corresponding deterioration of charging/discharging characteristics.

The middle block CB may extend (e.g., lengthwise) in the third direction Z3 in which the first coupling block CF is assembled and may include three sub-blocks MB, SB1, and SB2 spaced apart from each other with an assembly gap g2 therebetween in the second direction Z2. The assembly gap g2 in or around the middle block CB may facilitate avoiding physical interference with the end surface E of the finger portions P of the first end portions FF1 and FF2. The double plates FP that constitute the first end portions FF1 and FF2 may be apart from each other with the cavity portion therebetween and may be connected to each other through the end surface E of the finger portion P. In an implementation, the end surface E of the finger portion P may block the cavity portion. To reduce or avoid physical interference with the end surface E of the finger portion P, the assembly gap g2 may be in or around the middle block CB. In an implementation, the end surface E of the finger portion P on the first end portions FF1 and FF2 may be fitted into the assembly gap g2 of the middle block CB.

The middle block CB may include three sub-blocks MB, SB1, and SB2 arranged in or along the second direction Z2 with the assembly gap g2 therebetween and may include the central sub-block MB, and the first and second side blocks SB1 and SB2 at two opposite sides of the central sub-block MB. In an implementation, the central sub-block MB of the first coupling block CF may be fitted into the central cavity portion CH of the first end portions FF1 and FF2, and the first and second side blocks SB1 and SB2 of the first coupling block CF may be fitted into the first and second side cavity portions SH1 and SH2 of the first end portions FF1 and FF2. In an implementation, the double plates FP of the first end portions FF1 and FF2 may fit into the assembly gap g1 between the outer and inner cover plates CP1 and CP2 and the middle block CB of the first coupling block CF. The end surface E of the finger portion P at the first end portions FF1 and FF2 may be fitted into the assembly gap g2 of the first coupling block CF. Accordingly, the central sub-block MB and the first and second side sub-blocks SB1 and SB2 of the first coupling block CF may be fitted into the central cavity portion CH and the first and second side cavity portions SH1 and SH2 of the first end portions FF1 and FF2.

The central sub-block MB and the first and second side sub-blocks SB1 and SB2 of the first coupling block CF that constitute the middle block CB of the first coupling block CF may have a cavity shape that is empty inside (e.g., hollow) or a solid shape filled inside. In an implementation, the central sub-block MB may have a solid shape filled inside, and the first and second side sub-blocks SB1 and SB2 may have a cavity shape which is empty inside.

The first end portions FF1 and FF2 are elements of the first and second frames F1 and F2 and may include a metal material like other portions of the first and second frames F1 and F2. The first coupling block CF assembled or coupled to the first end portions FF1 and FF2 may include a resin material. In an implementation, the first coupling block CF may include an innermost portion (the inner cover plate CP1) and an outermost portion (the outer cover plate CP2) from among a frame structure arranged on the front position of the group of battery cells 10, the innermost portion facing the battery cell 10, and the outermost portion being opposite to (e.g., facing away from) the battery cell 10. In this case, the first coupling block CF may include the resin material to have an electric insulation characteristic, and may insulate the first end portions FF1 and FF2 from the group of battery cells 10 through the inner cover plate CP1, and may insulate the first end portions FF1 and FF2 from an external environment through the outer cover plate CP2. The first end portions FF1 and FF2 may include a metal material with a view toward a heat-dissipating characteristic. In this case, the outer surface of the battery cell 10 may have polarity depending on a specific structure. Accordingly, the first coupling block CF may include a resin material having an electric insulation characteristic for electric insulation between the first end portions FF1 and FF2 and the battery cell 10 and electric insulation between the first end portions FF1 and FF2 and the external environment.

In an implementation, the first end portions FF1 and FF2 and the first coupling block CF including different kinds of materials may overlap each other (e.g., may be aligned along the first direction Z1) at the front position of the group of battery cells 10. In an implementation, the first end portions FF1 and FF2 having a metal material may be advantageous in an aspect of an impact-resistance characteristic, and the first coupling block CF having a resin material may be advantageous in an aspect of rigidity. The first end portions FF1 and FF2 and the first coupling block CF including different kinds of materials overlap each other, and thus, conflicting requirements or different desirable properties may be satisfied.

The first coupling block CF may be assembled to the first end portions FF1 and FF2 of the first and second frames F1 and F2 in the third direction Z3, the first and second frames F1 and F2 being fitted into each other in the second direction Z2. As described above, the first coupling block CF may be assembled in the direction (the third direction Z3) intersecting with the direction (the second direction Z2) in which the first end portions FF1 and FF2 of the first and second frames F1 and F2 are fitted to each other, and thus, coupling between the first coupling block CF and the first end portions FF1 and FF2 may be firmly maintained. As an example, the first end portions FF1 and FF2 could protrude convexly in the first direction Z1 due to the pressure of the group of battery cells 10. In this case, as contact pressure between the first coupling block CF and the first end portions FF1 and FF2 increases, coupling therebetween may be firmly maintained.

As described above, the first end portions FF1 and FF2 of the first and second frames F1 and F2 may be mutually coupled with the first coupling block CF fitted into or onto the first end portions FF1 and FF2 across the first end portions FF1 and FF2 that are engaged with each other. Similarly, the second end portions FR1 and FR2 of the first and second frames F1 and F2 may be mutually coupled with the second coupling block CR fitted into or onto the second end portions FR1 and FR2 across the second end portions FR1 and FR2 that are engaged with each other. In an implementation, the second end portions FR1 and FR2 may include the double plates FP facing each other in the first direction Z1 with a cavity portion therebetween. The double plates FP may include the protrusions (corresponding to the finger portions P) and the recesses R at alternating positions in the third direction Z3. In addition, the second coupling block CR may include the middle block CB and cover plates CP1 and CP2. In an implementation, the middle block CB may be inserted into the cavity portion of the second end portions FR1 and FR2, and the cover plates CP1 and CP2 may be spaced apart from the middle block CB with an assembly groove g1 therebetween. The cover plates CP1 and CP2 may be a pair of cover plates CP1 and CP2 formed front and back over two opposite sides of the middle block CB in the first direction Z1, and may include an inner cover plate CP1 and an outer cover plate CP2. The assembly groove g1 may be between the inner and outer cover plates CP1 and CP2 and the middle block CB. In this case, the double plates FP that constitute the second end portions FR1 and FR2 may be respectively fitted into the pair of assembly grooves g1 in the second coupling block CR. In an implementation, the second coupling block CR may include the resin material having an electric insulation characteristic, may insulate the second end portions FR1 and FR2 including a metal material from the battery cells 10 through the inner cover plate CP1, and may insulate the second end portions FR1 and FR2 from an external environment through the outer cover plate CP2. The middle block CB of the second coupling block CR may include three sub-blocks MB, SB1, and SB2 arranged with the assembly gap g2 therebetween, e.g., may include the central sub-block MB, and the first and second side blocks SB1 and SB2. The end surfaces E of the finger portion P of the second end portions FR1 and FR2 may be fitted into the assembly gap g2.

Referring to FIG. 2, the side portions FS1 and FS2 may extend in the first direction Z1, and may form edges or corners where they contact the first end portions FF1 and FF2 and the second end portions FR1 and FR2 that extend in the second direction Z2 at the front end and the rear end (e.g., in the first direction Z1). In an implementation, bush members or coupling holes B1 and B2 may be respectively at an edge position or corner formed by the side portions FS1 and FS2 and the first end portions FF1 and FF2, and at an edge position or corner formed by the side portions FS1 and FS2 and the second end portions FR1 and FR2. In an implementation, the coupling holes B1 and B2 may be cavity members that are empty inside, e.g., hollows or holes. The coupling holes B1 and B2 may provide fastening positions of the entire battery pack. Fasteners may be fitted into the coupling holes B1 and B2 by passing through the coupling holes B1 and B2. The fasteners may pass through the coupling holes B1 and B2 and may be fastened to a mounting plate on which the battery pack is mounted, and a position of the entire battery pack may be fixed on the mounting plate. In an implementation, the mounting plate may be inside an apparatus on which the battery pack is mounted, e.g., an electric vehicle. The position of the entire battery pack may be fixed inside the apparatus through the fastener fastened to the mounting plate. For stably fixing the position of the battery pack, the coupling holes B1 and B2 may be at four edge or corner positions of the battery pack, e.g., two edge positions formed by the side portions FS1 and FS2 and the first end portions FF1 and FF2 of the first and second frames F1 and F2, and two edge positions formed by the side portions FS1 and FS2 and the second end portions FR1 and FR2.

The coupling holes B1 and B2 may be at the edge positions where the side portions FS1 and FS2 contact or meet the first end portions FF1 and FF2, and at least a portion of the coupling holes B1 and B2 may be exposed from or open at the side portions FS1 and FS2 and the first end portions FF1 and FF2. In an implementation, the side portions FS1 and FS2 may be connected to the first end portions FF1 and FF2 at two opposite end positions in a lengthwise direction of the coupling holes B1 and B2. The side portions FS1 and FS2 and the first end portions FF1 and FF2 connected to each other may surround the two opposite end positions of the coupling holes B1 and B2. The central position of the coupling holes B1 and B2 in the lengthwise direction may be exposed from or open at the side portions FS1 and FS2 and the first end portions FF1 and FF2.

Similarly, the coupling holes B1 and B2 may be at the edge positions where the side portions FS1 and FS2 contact the second end portions FR1 and FR2, and at least a portion of the coupling holes B1 and B2 may be exposed from or open at the side portions FS1 and FS2 and the second end portions FR1 and FR2. In an implementation, the side portions FS1 and FS2 may be connected to the second end portions FR1 and FR2 at two opposite end positions in a lengthwise direction of the coupling holes B1 and B2. The side portions FS1 and FS2 and the second end portions FR1 and FR2 connected to each other may surround the two opposite end positions of the coupling holes B1 and B2. The central position of the coupling holes B1 and B2 in the lengthwise direction may be exposed from or open at the side portions FS1 and FS2 and the first end portions FF1 and FF2.

Referring to FIG. 2, the bus bar holder BH may be on the terminal surface 11 of the battery cell 10. The bus bar holder BH may guide an assembly position of a bus bar electrically connected to the first and second electrode terminals 11a and 11b on the terminal surface 11 of the battery cell 10, and may maintain the assembly position of the bus bar at a correct position. In addition, the bus bar holder BH may help block electric interference between the battery cell 10 and the bus bar and help block electric interference between a circuit portion on the bus bar holder BH and the battery cell 10.

In an implementation, the bus bar holder BH may guide assembly positions of a plurality of bus bars electrically connected to the group of battery cells 10 and may extend across the terminal surface 11 of the group of battery cells 10. A plurality of terminal holes may be in the bus bar holder BH, the plurality of terminal holes exposing the first and second electrode terminals 11a and 11b of each battery cell 10. Bus bars may be respectively coupled to the first and second electrode terminals 11a and 11b exposed from the bus bar holder BH through the terminal holes, and thus, different battery cells 10 may be electrically connected to each other. In an implementation, the first and second electrode terminals 11a and 11b exposed through the terminal holes of the bus bar holder BH may be coupled to the bus bars through welding.

In an implementation, the bus bar holder BH may be on the terminal surface 11 of the group of battery cells 10, and then the first and second frames F1 and F2 may be assembled to surround the outside of the group of battery cells 10. In an implementation, the bus bar holder BH may be on the terminal surface 11 of the group of battery cells 10, then, the first and second frames F1 and F2 may be assembled in the second direction to face each other from the two opposite lateral surfaces 14 of the battery cells 10 with the group of battery cells 10 therebetween, in which the first and second frames F1 and F2 may be assembled on the lateral surfaces of the group of battery cells 10 such that the first protrusion pieces FSb formed on the first and second frames F1 and F2 are put on the rim of the bus bar holder BH arranged on the terminal surface 11 of the battery cell 10, and the second protrusion pieces FSc formed on the first and second frames F1 and F2 are put on the bottom surface 12 of the battery cell 10. In an implementation, welding between the first and second electrode terminals 11a and 11b of the terminal surface 11 and the bus bar may be performed through the bus bar holder BH temporarily fixed on the terminal surface 11 of the battery cell 10 through the first protrusion piece FSb. As described above, welding between the first and second electrode terminals 11a and 11b and the bus bar may be performed, and thus, the position of the bus bar holder BH between the first and second electrode terminals 11a and 11b and the bus bar may be fixed on the terminal surface 11 of the battery cell 10. Through the first protrusion piece FSb on the bus bar holder BH of which the position is fixed and the second protrusion piece FSc put on the bottom surface 12 of the battery cell 10, the first and second frames F1 and F2 may be on the lateral surfaces 14 of the group of battery cells 10.

By way of summation and review, miniaturized mobile apparatuses such as mobile phones may operate for a preset period with power and capacity of a single battery. In the case where long-time driving and high-power driving are use such as electric automobiles and hybrid automobiles that consume lots of power, a module form that includes a plurality of batteries may be due to power and capacity issues, and an output voltage or output current may be raised depending on the number of built-in batteries.

One or more embodiments may provide a battery pack in which a connection structure of a group of battery cells is simplified and connection force may be reinforced through assembling of a frame that is integrally formed, and rigidity in an arrangement direction of a group of battery cells may be improved.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery pack, comprising:
a plurality of battery cells arranged in a first direction; and
a first frame and a second frame each extending in the first direction with the plurality of battery cells therebetween, the first frame and the second frame surrounding outer surfaces of the plurality of battery cells and being fitted into each other in a second direction that intersects with the first direction, each of the first and second frames including a side portion extending in the first direction; and a first end portion and a second end portion each extending in the second direction that intersects with the first direction from a front end and a rear end of the side portion in the first direction, and surrounding a front and a rear of the plurality of battery cells;
a first coupling block configured to couple the first end portions of the first and second frames to each other and extending across the first end portions of the first and second frames that are fitted and engaged with each other; and
a second coupling block configured to couple the second end portions of the first and second frames to each other and extending across the second end portions of the first and second frames that are fitted and engaged with each other,
wherein:
the first end portion and the second end portion each include a hollow cavity portion therein,
at least a portion of the first coupling block and the second coupling block is fitted into the cavity portions of the first end portion and the second end portion, and
the first end portion and the second end portion each further include:
double plates facing each other in the first direction with the cavity portion therebetween, and
protrusions extending in the second direction and recesses recessed in the second direction alternately stacked in a third direction of the double plate.

2. The battery pack as claimed in claim 1, wherein:
the first end portions of the first and second frames have complementary shapes such that the first end portions are fitted into and engaged with each other, and
the second end portions of the first and second frames have complementary shapes such that the second end portions are fitted into and engaged with each other.

3. The battery pack as claimed in claim 1, wherein:
the first end portion and the second end portion of the first and second frames each include finger portions and a base portion,
the finger portions have complementary comb shapes and are fitted into each other, and
the base portion connects the finger portions to each other.

4. The battery pack as claimed in claim 1, wherein the first end portion and the second end portion of each of the first and second frames include protrusions extending in the second direction and recesses recessed in the second direction, the protrusions and recesses being alternately stacked in a third direction that intersects with the first direction and the second direction.

5. The battery pack as claimed in claim 1, wherein:
the first coupling block is assembled in a third direction onto the first end portions of the first and second frames that are fitted and engaged with each other in the second direction, the third direction intersecting with the second direction, and the second coupling block is assembled in the third direction onto the second end portions of the first and second frames that are fitted and engaged with each other.

6. The battery pack as claimed in claim 1, wherein the first coupling block and the second coupling block each include:
a middle block inserted into the cavity portion; and
a cover plate spaced apart from the middle block with an assembly groove between the cover plate and the middle block.

7. The battery pack as claimed in claim 6, wherein at least a portion of the first end portion and the second end portion is fitted into the assembly groove.

8. The battery pack as claimed in claim 6, wherein the cover plate includes a pair of an inner cover plate and an outer cover plate over two opposite sides of the middle block, the inner cover plate and the outer cover plate being spaced apart from each other with the assembly groove therebetween.

9. The battery pack as claimed in claim 8, wherein:
the first end portion and the second end portion each include double plates facing each other in the first direction with the hollow cavity portion therebetween, and
the double plates are each fitted into one assembly groove between the inner cover plate and the middle block, and another assembly groove between the outer cover plate and the middle block.

10. The battery pack as claimed in claim 9, wherein the double plates of the first end portion and the second end portion, the inner and outer cover plates, and the middle block overlap one another to constitute a total of a five-layered overlapping structure at front and rear positions of the plurality of battery cells.

11. The battery pack as claimed in claim 8, wherein:
the inner cover plate is between the first end portion and the plurality of battery cells and between the second end portion and the plurality of battery cells, and
the outer cover plate is on an outer surface of the first end portion and an outer surface of the second end portion.

12. The battery pack as claimed in claim 11, wherein the first coupling block and the second coupling block each include an electrically insulating resin material.

13. The battery pack as claimed in claim 1, wherein the side portion includes a plurality of lines of reinforcing ribs having concave or convex shapes and extending side by side in the first direction.

14. The battery pack as claimed in claim 1, wherein:
the plurality of battery cells each include:
a terminal surface,
a bottom surface,
a main surface, and
a lateral surface,
the terminal surface includes at least one electrode terminal,
the bottom surface is opposite to the terminal surface,
the main surface connects the terminal surface to the bottom surface and has a first area, and
the lateral surface connects the terminal surface to the bottom surface and has a second area, the second area being smaller than the first area.

15. The battery pack as claimed in claim 14, wherein the side portion supports the terminal surface and the bottom surface of the plurality of battery cells and includes a first protrusion piece and a second protrusion piece each protruding from a main body of the side portion that covers lateral surfaces of the plurality of battery cells to the terminal surface and the bottom surface.

16. The battery pack as claimed in claim 15, further comprising a bus bar holder on the terminal surface of the plurality of battery cells and configured to guide an assembling position of a bus bar connected to the electrode terminal of the plurality of battery cells.

17. The battery pack as claimed in claim 16, wherein the first protrusion piece is on a rim of the bus bar holder.

18. The battery pack as claimed in claim 15, wherein the second protrusion piece is on the bottom surface of the plurality of battery cells.

19. The battery pack as claimed in claim 1, wherein a coupling hole is at an edge position where the side portion meets the first end portion and at an edge position where the side portion meets the second end portion.

20. The battery pack as claimed in claim 19, wherein the coupling hole includes a hollow cavity.

21. The battery pack as claimed in claim 19, wherein at least a portion of the coupling hole is exposed between the side portion and the first end portion and between the side portion and the second end portion.

22. The battery pack as claimed in claim 1, further comprising a spacer assembly between adjacent battery cells in the first direction, the spacer assembly including spacers having a rim shape surrounding an opening at a central position.

23. The battery pack as claimed in claim 22, wherein:
the spacers of the spacer assembly are arranged in the first direction, and
each of the spacers is connected to an adjacent spacer in the spacer assembly, the spacers being connected with a plurality of connectors that connect the adjacent spacers at alternating positions of one side and another side opposite to each other in the second direction, and extending in the first direction.

* * * * *